United States Patent
Ling et al.

(10) Patent No.: US 11,343,591 B2
(45) Date of Patent: May 24, 2022

(54) METHOD AND SYSTEM OF PRESENTING MOVING IMAGES OR VIDEOS CORRESPONDING TO STILL IMAGES

(71) Applicant: SAMSUNG ELECTRONICS CO., LTD., Suwon-si (KR)

(72) Inventors: Xiao Ling, Jiangsu (CN); Junqing Ma, Jiangsu (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/288,700

(22) PCT Filed: Jul. 2, 2019

(86) PCT No.: PCT/KR2019/008046
§ 371 (c)(1),
(2) Date: Apr. 26, 2021

(87) PCT Pub. No.: WO2020/111426
PCT Pub. Date: Jun. 4, 2020

(65) Prior Publication Data
US 2021/0400359 A1    Dec. 23, 2021

(30) Foreign Application Priority Data
Nov. 30, 2018 (CN) .......................... 201811450323.5

(51) Int. Cl.
*H04N 21/81* (2011.01)
*G06F 16/783* (2019.01)
(Continued)

(52) U.S. Cl.
CPC ..... *H04N 21/8153* (2013.01); *G06F 16/7837* (2019.01); *G06V 10/443* (2022.01); *H04N 21/2743* (2013.01); *H04N 21/8586* (2013.01)

(58) Field of Classification Search
CPC ........... H04N 21/8153; H04N 21/2743; H04N 21/8586; G06F 16/7837; G06V 10/443
See application file for complete search history.

(56) References Cited

U.S. PATENT DOCUMENTS 9,055,169 B2   6/2015 Mohan
9,324,014 B1   4/2016 Dixon et al.
(Continued)

FOREIGN PATENT DOCUMENTS

CN   103955499   7/2014
CN   104077596   10/2014
(Continued)

OTHER PUBLICATIONS

First Office Action dated Jun. 12, 2020 in counterpart Chinese Patent Application No. 201811450323.5 and English-language translation.
(Continued)

*Primary Examiner* — Oschta I Montoya
(74) *Attorney, Agent, or Firm* — Nixon & Vanderhye, P.C.

(57) ABSTRACT

The present application discloses a method of presenting moving images or videos corresponding to still images. The method includes: storing a still image and a moving image or video corresponding to the still image into a cloud storage; extracting feature points of the still image stored in the cloud storage, and storing the feature points in the cloud storage in a manner which associates the feature points with the still image; when a device obtains a first still image through scanning, extracting feature points from the first still image, comparing and judging whether the extracted feature points match feature points of each still image stored in the cloud storage to determine a second still image whose feature points match the feature points of the first still image; rendering a moving image or video corresponding to the
(Continued)

second still image stored in the cloud storage at the position of the first still image. The present application can facilitate presenting a moving image corresponding to a still image, and increase the information and entertainment provided by a still image.

12 Claims, 4 Drawing Sheets

(51) Int. Cl.
*G06V 10/44* (2022.01)
*H04N 21/2743* (2011.01)
*H04N 21/858* (2011.01)

(56) References Cited

U.S. PATENT DOCUMENTS

| | | | |
|---|---|---|---|
| 9,547,222 B2 | 1/2017 | Smith et al. | |
| 9,959,681 B2 * | 5/2018 | Jeong | H04N 5/262 |
| 2013/0155474 A1 | 6/2013 | Roach et al. | |
| 2013/0207973 A1 * | 8/2013 | Mattila | A63F 13/52 |
| | | | 345/420 |
| 2016/0198098 A1 | 7/2016 | Song et al. | |
| 2016/0366340 A1 * | 12/2016 | Okamoto | H04N 5/2259 |
| 2018/0075883 A1 | 3/2018 | Aroyo et al. | |
| 2018/0101504 A1 * | 4/2018 | DiTomaso | G06T 13/80 |
| 2019/0132521 A1 * | 5/2019 | Fujita | H04N 5/23238 |
| 2020/0012858 A1 | 1/2020 | Xiang | |
| 2020/0260018 A1 * | 8/2020 | Horikawa | G06T 7/70 |

FOREIGN PATENT DOCUMENTS

| | | |
|---|---|---|
| CN | 104574473 | 4/2015 |
| CN | 104574484 | 4/2015 |
| CN | 105405168 | 3/2016 |
| CN | 106598238 | 4/2017 |
| CN | 106664465 | 5/2017 |
| CN | 107221346 | 9/2017 |
| CN | 107590453 | 1/2018 |
| CN | 107980140 | 5/2018 |
| JP | 2016-139968 | 8/2016 |
| KR | 10-1189609 | 10/2012 |
| KR | 10-2017-0058517 | 5/2017 |
| KR | 10-1794642 | 12/2017 |
| WO | 2020/111426 | 6/2020 |

OTHER PUBLICATIONS

Second Office Action dated Dec. 8, 2020 in counterpart Chinese Patent Application No. 201811450323.5 and English-language translation.
Decision of Rejection dated Apr. 12, 2021 in counterpart Chinese Patent Application No. 201811450323.5 and English-language translation.
International Search Report for PCT/KR2019/008046 dated Oct. 11, 2019, 3 pages.
Written Opinion of the ISA for PCT/KR2019/008046 dated Oct. 11, 2019, 6 pages.

* cited by examiner

[Fig. 1]
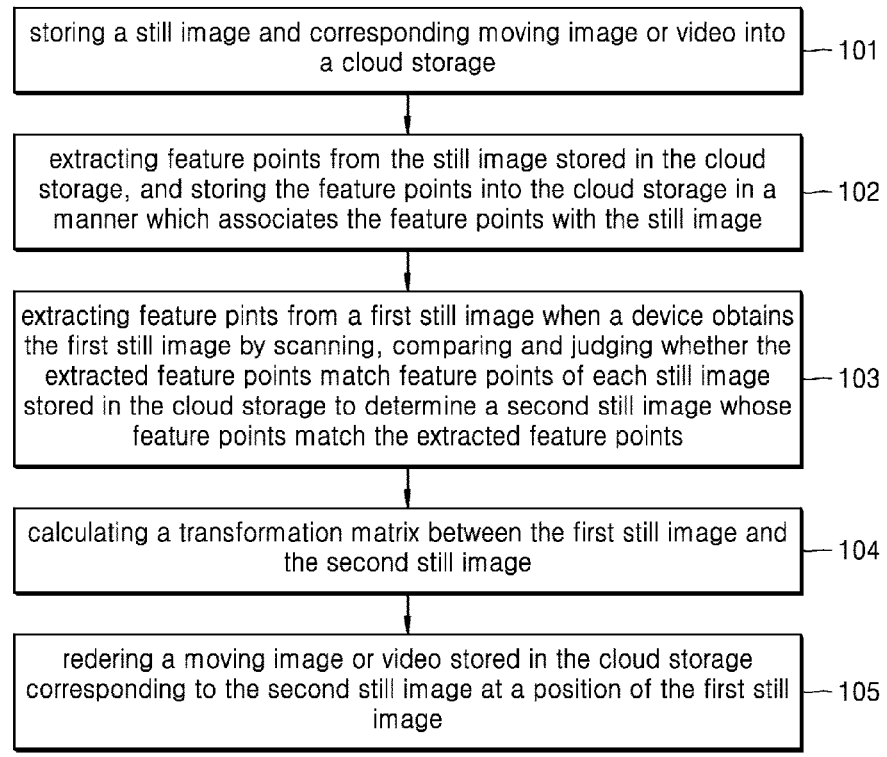
[Fig. 2a]
[Fig. 2b]
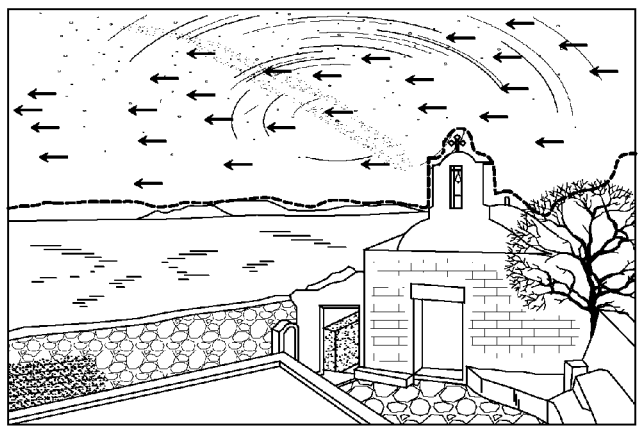

[Fig. 3]
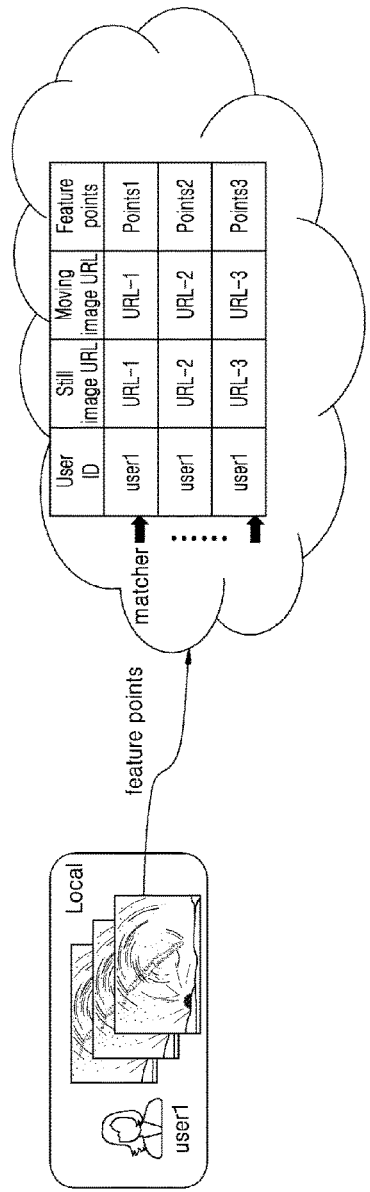
[Fig. 4]
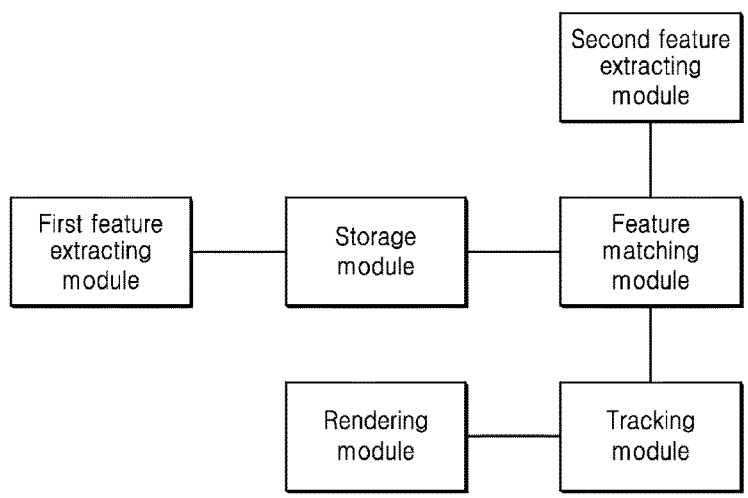

[Fig. 5]
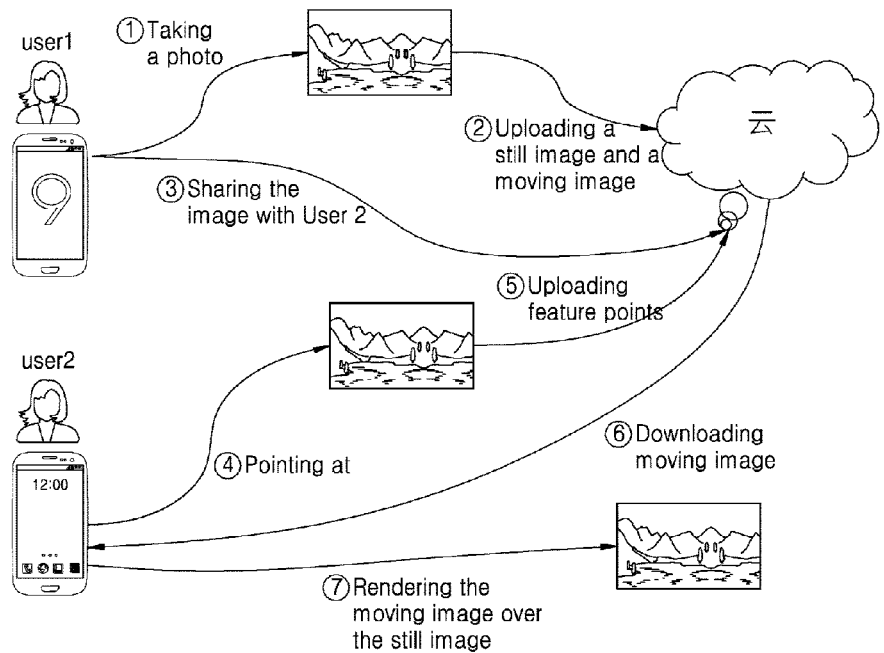
[Fig. 6]
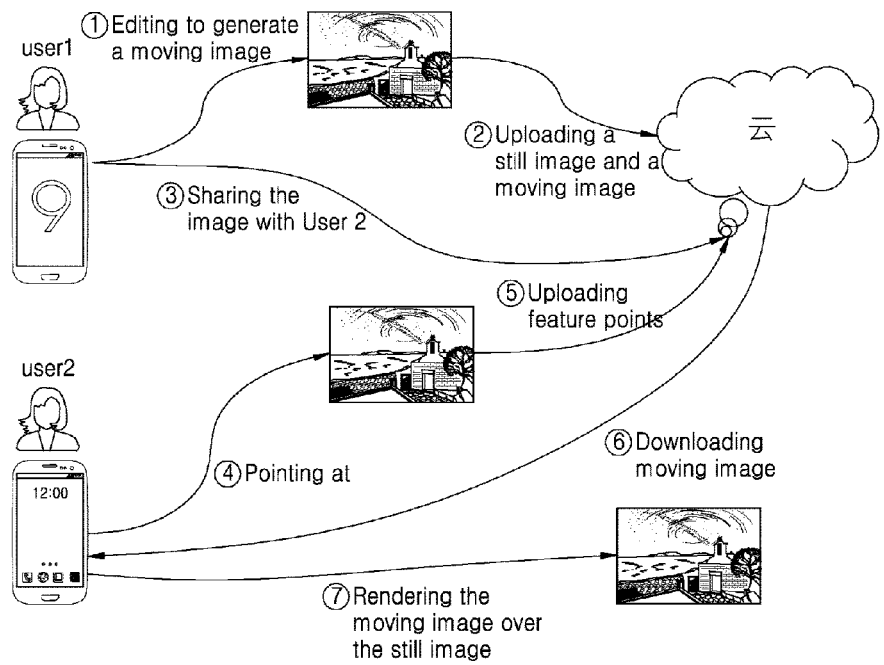

[Fig. 7]
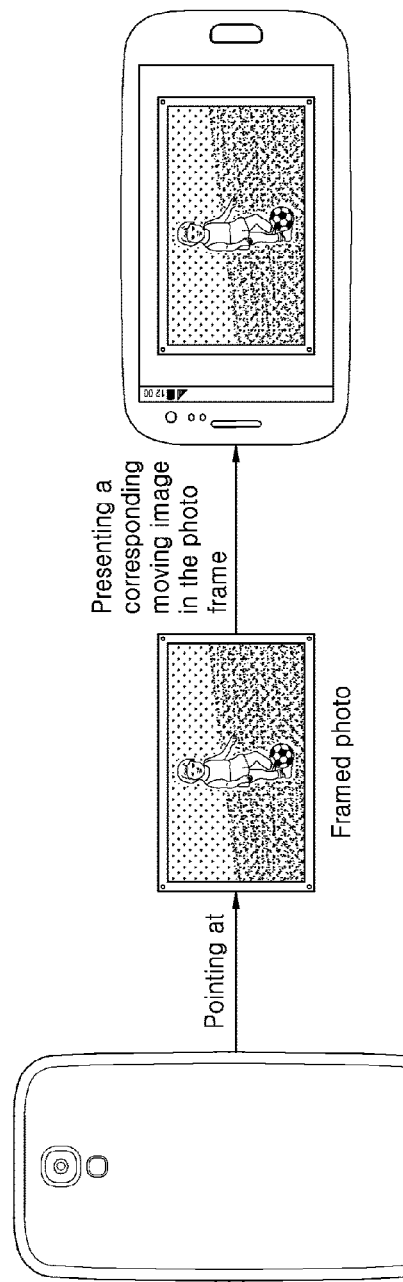

METHOD AND SYSTEM OF PRESENTING MOVING IMAGES OR VIDEOS CORRESPONDING TO STILL IMAGES

This application is the U.S. national phase of International Application No. PCT/KR2019/008046 filed Jul. 2, 2019 which designated the U.S. and claims priority to CN Patent Application No. 201811450323.5 filed Nov. 30, 2018, the entire contents of each of which are hereby incorporated by reference.

TECHNICAL FIELD

The present application relates to computer vision technology, and particularly, to a method and a system of presenting moving images or videos corresponding to still images.

BACKGROUND ART

Pictures or flat posters in the real world are all static which are not sufficiently funny and informative. With developments in science and technology, moving images or videos can be obtained in more and more manners. Costs may increase significantly for directly playing the moving images or videos because specific electronic carriers are often required.

Meanwhile, given that still images are less entertaining and less informative, some still images associated with still images are stored in some related devices (for example, some devices can generate moving images when taking photos), and can only be displayed on the devices which store the moving images. In fact, those moving images are not fully used. In addition, many devices are not capable of automatically generating moving images while taking photos, and thus cannot display moving images associated with photos.

DISCLOSURE OF INVENTION

Solution to Problem

The present application provides a method of presenting moving images corresponding to still images at a mobile device, to facilitate presenting moving images corresponding to still images and to increase the information and entertainment provided by still images.

To attain the above objective, the present application provides the following technical mechanisms.

A method of presenting moving images or videos corresponding to still images may include:

storing a still image and a moving image or video corresponding to the still image into a cloud storage;

extracting feature points from the still image stored in the cloud storage, and storing the feature points into the cloud storage in a manner which associates the feature points with the still image;

extracting feature points from a first still image when a device obtains the first still image through scanning, comparing and judging whether the extracted feature points match feature points of each still image stored in the cloud storage to determine a second still image whose feature points match the feature points of the first still image;

rendering a moving image or video corresponding to the second still image stored in the cloud storage at a position of the first still image.

Advantageous Effects of Invention

It is possible for automatically generating moving images while taking photos, and displaying moving images associated with photos.

BRIEF DESCRIPTION OF DRAWINGS

FIG. 1 is a flowchart illustrating a basic method of presenting moving images or videos according to the present application;

FIG. 2a illustrates an original still image;

FIG. 2b is a schematic diagram illustrating an editing process for generating a moving image;

FIG. 3 is a schematic diagram illustrating feature matching;

FIG. 4 is a flowchart illustrating the basic structure of a system of presenting moving images or videos according to the present application;

FIG. 5 is a schematic diagram illustrating scenario one adopting the method of the present application;

FIG. 6 is a schematic diagram illustrating scenario two adopting the method of the present application; and FIG. 7 is a schematic diagram illustrating scenario three adopting the method of the present application.

BEST MODE FOR CARRYING OUT THE INVENTION

The present application provides a method of presenting moving images corresponding to still images at a mobile device, to facilitate presenting moving images corresponding to still images and to increase the information and entertainment provided by still images.

To attain the above objective, the present application provides the following technical mechanisms.

A method of presenting moving images or videos corresponding to still images may include:

storing a still image and a moving image or video corresponding to the still image into a cloud storage;

extracting feature points from the still image stored in the cloud storage, and storing the feature points into the cloud storage in a manner which associates the feature points with the still image;

extracting feature points from a first still image when a device obtains the first still image through scanning, comparing and judging whether the extracted feature points match feature points of each still image stored in the cloud storage to determine a second still image whose feature points match the feature points of the first still image;

rendering a moving image or video corresponding to the second still image stored in the cloud storage at a position of the first still image.

Preferably, the method of generating the moving image or video corresponding to the still image may include:

generating the moving image or video corresponding to the still image automatically when the still image is generated through photo shooting; or receiving anchor points configured by a user in the still image, dividing the still image into a moving part and a still part according to the anchor points; determining a movement intensity of the moving part according to a length of an arrow inputted by a user, and a movement direction of the moving part according to a direction of the arrow inputted by the user; generating the moving image or video corresponding to the still image by deforming image contents in the moving part according to the movement intensity and the movement direction while image contents in the still part is kept unchanged.

Preferably, feature points may be extracted by the device or a cloud device from the still image stored in the cloud storage.

Preferably, the step of extracting the feature points from the still image may include: dividing the still image into grids, and extracting feature points from image contents in each of the grids.

Preferably, thresholds for extracting feature points from different grids may be identical or different.

Preferably, when rendering the moving image or video associated with the second still image stored in the cloud storage at the position of the first still image, a transformation matrix between the first still image and the second still image may be calculated, and the rendering operation is performed according to the transformation matrix.

Preferably, the step of calculating the transformation matrix between the first still image and the second still image may include:

calculating an initial transformation matrix using an optical flow tracking algorithm, determining first feature points in the first still image according to the initial transformation matrix;

constructing, using the first still image, rectangular images which take the first feature points as center points and serve as matching templates, calculating an optimal matching position of each of the matching templates in the first still image to serve as second feature points, and calculating a transformation matrix between the second features points and feature points in the second still image to serve as the transformation matrix.

Preferably, the step of matching and judging whether the extracted feature points match feature points of each still image stored in the cloud storage may include:

comparing the extracted feature points with features points of each still image stored in the cloud storage to obtain pairs of corresponding feature points, judging whether each pair of corresponding feature points is qualified, making a determination that the extracted feature points match the feature points of a still image when the proportion of qualified pairs reaches or exceeds a pre-defined threshold.

Preferably, the method may also include: setting different matching thresholds according to different needs, and making the determination as to whether the extracted feature points match the feature points of a still image based on a matching threshold selected according to current needs when comparing the extracted feature points with features points of each still image stored in the cloud storage.

Preferably, the still image and the moving image or video corresponding to the still image stored in the cloud storage may include: a URL of the still image, a URL of the moving image or video.

Preferably, user information corresponding to the still image may be stored in the cloud storage;

storing information of another user into the cloud storage in a manner which associates the information of another user with a third still image when a user shares the third still image in the cloud storage with the another user.

Preferably, the step of extracting features points from the first still image may include: taking photos of the first still image at a pre-defined time rate, extracting feature points from each of the photos, comparing and judging whether the feature points of each photo respectively match with feature points of each still image stored in the cloud storage until a second still image whose feature points match the feature points of the photo is found.

A system of presenting moving images or videos corresponding to a still image may include: a storage module, a first feature extracting module, a second feature extracting module, a feature matching module and a rendering module;

the storage module may store a still image and corresponding moving image or video and feature points into a cloud storage;

the first feature extracting module may extract feature points of a still image stored in the cloud storage;

the second feature extracting module may extract feature points from a first still image when a device obtains the first still image by scanning;

the feature matching module may compare and judge whether the feature points extracted by the second feature extracting module match the feature points of each still image corresponding to the same user in the cloud storage to determine a matching second still image; and the rendering module may render a moving image or video corresponding to the second still image stored in the cloud storage at a position of the first still image.

Preferably, the system may also include a tracking module, for calculating a transformation matrix between the first still image and the second still image;

the rendering module may render a moving image or video corresponding to the second still image stored in the cloud storage at the position of the first still image according to the transformation matrix.

Preferably, the system may also include an editing module, for setting anchor points in the still image to divide the still image into a moving part and a still part; determining a movement intensity of the moving part according to a length of an arrow inputted by a user, and a movement direction of the moving part according to a direction of the arrow inputted by the user; generating the moving image or video corresponding to the still image by deforming image contents in the moving part according to the movement intensity and the movement direction while image contents in the still part is kept unchanged.

Preferably, the system may also include a setting module, for setting different matching thresholds according to different needs;

the feature matching module may also select a matching threshold according to current needs, and make a decision on whether a matching image is found based on the selected matching threshold when comparing and judging whether the extracted feature points match feature points of each still image stored in the cloud storage.

Preferably, the first feature extracting module resides in a cloud server or a terminal device.

It can be seen from the above technical mechanism that, the present application stores a still image and corresponding moving image or video into a cloud storage; extracts feature points from the still image and stores the feature points in the cloud storage in a manner which associates the feature points with the still image. When a device scans a first still image, feature points are extracted from the still image, compared matching with feature points of each still image stored in the cloud storage to determine a matching still image. A moving image or video corresponding to the matching still image stored in the cloud storage is rendered at a position of the scanned still image. Through the above mechanism, for a still image whose corresponding moving image or video is stored in the cloud storage, any device capable of rendering moving images or videos can render a moving image or video corresponding to the still image when the still image is scanned, thus the still image is enabled to provide more information and entertainment.

MODE FOR THE INVENTION

In order to make the objectives, technical schemes and merits of the present application clearer, a detailed description of the present application is hereinafter given with reference to specific embodiments.

In order to enable photos to provide more information and entertainment, the present application utilizes augmented reality (AR) techniques, identifies contents of a photo when a user points a device having rendering capabilities (e.g., a phone, AR glasses, etc.) at a still photo, and displays, at the place of the still photo, a moving image corresponding to the still photo stored under the same user account in a cloud storage. When the user adjusts the pose of the mobile device, the moving image is still displayed at the position of the still photo.

In order to achieve the above effects, the present application provides a method of presenting moving images or videos as shown in FIG. 1. As shown in FIG. 1, the method may include the following procedures.

At step 101, a still image and a moving image or video corresponding to the still image are stored into a cloud storage.

The present application does not limit the manner of generating the moving image or video corresponding to the still image. For example, the moving image or video may be automatically generated when the still image is generated from photo shooting, or generated using the still image in a manner specified by a user (i.e., inputted manually by the user), or the like.

The following is a preferred example of generating a moving image according to information manually inputted by a user.

FIG. 2a illustrates an original still image. A user inputs anchor points for distinguishing a moving part from a still part of the still image. For example, as shown in FIG. 2b, a curve composed of a plurality of points divides the still image into two parts, i.e., an upper part and a lower part. The lower part (i.e., the ground, wall, church, trees, etc.) is the still part which stays unchanged in the moving image. The upper part (i.e., the blue sky and the white cloud) serves as the moving part which implements moving effects in the moving image. Then, the user may add information specifying the direction and the length of an arrow to the moving part of the still image, to specify the direction and intensity of the change of the moving part. For example, as shown in FIG. 2b, the direction of the arrow specifies the moving part may move leftwards, and the length of the arrow specifies the movement intensity of the moving part. The terminal device may divide the still image into a still part and a moving part according to the anchor points inputted by the user, and determines the direction and the intensity of the image movement in the moving part according to the direction and the length of the arrow inputted by the user. Then, a moving image may be generated according to the determined direction and intensity of the image movement. The deformation of the image may be implemented using existing algorithms, e.g., image morphing, etc. The original image may be transformed to the deformed image using methods such as linear interpolation, or the like.

In addition, it is preferably to store the URL of the moving image or video and the URL of the still image when the still image and the moving image or video are stored into the cloud storage.

At step 102, feature points may be extracted from the still image stored in the cloud storage, and stored into the cloud storage in a manner which associates the feature points with the still image.

In this step, the feature points may be extracted and a descriptor may be calculated. The feature points may include, but not limited to, AKAZE (accelerated KAZE) keypoints, Oriented FAST and rotated BRIEF (ORB) keypoints, KAZE keypoints, Binary Robust Invariant Scalable Keypoints (BRISK), or the like. The feature points may be extracted using an existing method. Preferably, in order to make the extracted feature points more evenly distributed, the still image may firstly be divided into grids, and feature points may be extracted from image contents in each small grid. The number of features points extracted from different grids may vary greatly due to the differences in image features in different grids. In such case, it is preferably to dynamically adjust a threshold for point extraction to have sufficient number of feature points be extracted from each small grid. The same or different thresholds may be applied to different grids, so that the number of feature points extracted from different grids does not vary too much.

In addition, the extraction of feature points in this step may be carried out at a terminal, or at the cloud side. When the feature point extraction is carried out at the terminal, the extracted feature points may be transmitted to the cloud storage to be associated with the still image and stored.

At step 103, when a device obtains a first still image through scanning, feature points may be extracted from the first still image, compared and matched with feature points of each still image stored in the cloud storage to determine a second still image whose feature points match the feature points of the first still image.

This step is a feature matching processing. Firstly, features points may be extracted from the first still image. Generally, photos of the first still image may be taken at a pre-defined time rate, and feature points may be extracted from each of the photos. The feature points of each photo are compared and matched respectively with feature points of each still image stored in the cloud storage until a second still image whose feature points match the feature points of the photo is found.

The method of extracting feature points from each photo may be the same with the method used in step 102, and thus is not elaborated herein. The processing may be carried out at the terminal device, or at the cloud side. The device implementing the process may be different from that in step 102.

After that, the extracted feature points may be compared with features points of each still image stored in the cloud storage to obtain pairs of corresponding feature points. It may be judged whether each pair of corresponding feature points is qualified. When the proportion of qualified pairs reaches or exceeds a pre-defined threshold, it may be determined that the extracted feature points match the feature points of a still image. The method of matching the feature points may be any one of existing manners, e.g., Fast Library for Approximate Nearest Neighbors (FLANN) based matcher, or BruteForce based matcher, or the like. In addition, a user to whom each still image belongs may preferably be recorded and associated with the still image when a moving image and feature points corresponding to the still image are stored in the cloud storage, so as to identify images belonging to different users. When corresponding user information is stored, the comparison of feature points in this step may preferably include comparing features points of the first still image with feature points of each still image corresponding to the same user in the cloud storage. The user may be a specific user, or may be configured to be a public user or all user, etc., so that moving images or videos corresponding to the still images are open for comparison for all of users. Meanwhile, when a user shares a still image A of the user stored in the cloud storage with another user, information of the another user may be recorded to be associated with the still image A in the cloud storage. For example, a new data item may be inserted, which includes the user ID of the another user, the URL of the still image A, the URL of a moving image, and feature points.

In addition, considering diversified demands, different matching thresholds may be configured according to different needs during feature point comparison and matching. When comparing and judging whether the extracted feature points match feature points of each still image stored in the cloud storage, the decision may be made based on a matching threshold selected according to the current needs.

FIG. 3 is a schematic diagram illustrating feature matching.

At step 104, a transformation matrix between the first still image and the second still image may be calculated.

The calculation of the transformation matrix in this step is in fact a tracking procedure, and may use various existing methods, e.g., optical flow tracking algorithm, template matching algorithm, or the like. Existing tracking algorithms have some disadvantages. For example, the optical flow tracking algorithm is sensitive to light changes, and an optical flow can be observed when the external illumination changes even if the object does not move; the template matching algorithm cannot cope with rotations and scalings, and may be ineffective if the image to be matched has been rotated and scaled.

In view of the disadvantages of the above algorithms, the present application provides a preferred tracking algorithm which jointly utilizes the optical flow tracking algorithm and the template matching algorithm. The tracking algorithm may include: performing a first tracking using the optical flow tracking algorithm, calculating a transformation matrix (referred to as initial transformation matrix hereinafter), and using the initial transformation matrix to determine feature points A of the first still image used in the optical flow tracking algorithm, i.e., feature points tracked by the optical flow tracking algorithm. The tracking algorithm also includes: constructing, using the template matching algorithm based on the feature points A and the first still image, a group of rectangular images having a size of 20 pixels*20 pixels (the size is not limited to 20*20) with the feature points A as center points which serve as templates for matching, calculating optimal matching positions of the templates in the first still image, i.e., a group of points B; calculating a transformation matrix between the points B and a group of feature points C in the second still image, which serves as the transformation matrix provided for use by a rendering module.

In the present application, the transformation matrix is calculated by jointly using a conventional optical flow tracking algorithm and a template matching algorithm to provide more robust tracking effects. Firstly, the initial transformation matrix (e.g., a uniform matrix) and inner points (feature points A) may be calculated using the optical flow tracking algorithm and Random Sample Consensus (RANSAC). Then, correction may be performed using the template matching algorithm based on the initial transformation matrix and the inner points to obtain the final transformation matrix. By jointly using the optical flow tracking algorithm and the template matching algorithm, preciseness and robustness of the tracking can be improved.

At step 105, a moving image or video corresponding to the second still image stored in the cloud storage may be rendered at the position of the first still image according to the transformation matrix.

In this step, the moving image or video in the cloud storage corresponding to the second still image may be rendered at the position of the first still image according to a current latest position of the first still image and the transformation matrix obtained in step 104. The rendering method may be a conventional method, and is not elaborated herein.

In addition, rendering of the moving image or video corresponding to the second still image at the position of the first still image may not be necessarily based on the transformation matrix, and may be implemented in other manners as long as the rendering procedure can be implemented. The above process of calculating a transformation matrix and rendering based on the transformation matrix is currently one of commonly used method, and the present application may use other process instead. That is, the step 104 in FIG. 1 is not necessary, and other methods may be used as long as the rendering procedure in step 105 can be implemented.

Hence, the above process is completed.

The present application also provides a system of presenting moving images or videos corresponding to still images, and the system is capable of implementing the above method. FIG. 4 is a schematic diagram illustrating the basic structure of the system in accordance with the present application. As shown in FIG. 4, the system may include: a storage module, a first feature extracting module, a second feature extracting module, a feature matching module, a tracking module and a rendering module.

The storage module may store a still image and corresponding moving image or video and feature points in a cloud storage. The first feature extracting module may extract feature points of a still image stored in the cloud storage. The second feature extracting module may extract feature points of a first still image when a device obtains the first still image by scanning. The feature matching module may compare and judge whether the feature points extracted by the second feature extracting module match the feature points of each still image corresponding to the same user in the cloud storage to determine a matching second still image. The tracking module may calculate a transformation matrix between the first still image and the second still image. The rendering module may render a moving image or video corresponding to the second still image stored in the cloud storage at the position of the first still image according to the transformation matrix.

As stated in step 105, at present, the commonly used rendering process is based on the transformation matrix, which is implemented by the tracking module in the system. In fact, the present application is not limited to the procedure, i.e., the system may not necessarily include the tracking module, and the system may be implemented in other manners as long as the rendering module can perform the rendering.

The system may also include an editing module for generating a moving image corresponding to the still image. Specifically, anchor points may be configured in the still image for dividing the still image into a moving part and a still part. The movement intensity of the moving part may be determined according to the length of an arrow inputted by a user, and the movement direction of the moving part may be determined according to the direction of the arrow inputted by the user. The moving image or video corresponding to the still image may be generated by deforming image contents in the moving part according to the movement intensity and movement direction while image contents in the still part is kept unchanged.

In order to meet different demands, the feature matching criteria may be dynamically adjusted. Preferably, the system may also include a setting module for setting up different matching thresholds for different needs. The feature matching module may also select a matching threshold according to current needs, and make a decision on whether a matching image is found based on the selected matching threshold when comparing and judging whether the extracted feature points match feature points of each still image stored in the cloud storage.

In the above system, some modules may reside in a terminal device, and some modules may reside in a cloud server. The storage module and the feature matching module may reside in a cloud server, and the tracking module, the rendering module, and the setting module and the editing module may reside in the terminal device. The first feature extracting module and the second feature extracting module may reside in the terminal device, or may reside in the cloud server, and may reside in different entities.

The following are three application scenarios of the method and the system of the present application.

Scenario One:

1. User 1 takes a photo using a mobile device capable of automatically generating moving images, thus generates a still image (i.e., photo A) and corresponding moving image. User 1 uploads the still image and the moving image to the cloud storage.

2. User 1 shares the photo A with User 2.

3. User 2 points a mobile device incapable of automatically generating moving images at the still photo A, and the mobile device performs feature extraction and uploads extracted feature points to the cloud storage.

4. When a matching image is found, User 2 downloads a moving image in connection with the still image to the mobile device.

5. The mobile device of User 2 tracks the still image and renders the downloaded moving image at the position of the still image, as shown in FIG. 5.

Scenario Two:

1. User 1 manually edits a still image A to generate a moving image corresponding to the still image A.

2. User 1 uploads the still image A and the moving image to the cloud storage.

3. User 1 shares the still image A with User 2.

4. User 2 points a mobile device incapable of automatically generating moving images at the still image A, and the mobile device performs feature extraction and uploads extracted feature points to the cloud storage.

5. When a matching image is found, User 2 downloads a moving image in connection with the still image to the mobile device.

6. The mobile device of User 2 tracks the still image and renders the downloaded moving image at the position of the still image, as shown in FIG. 6.

Scenario Three:

1. User 1 points a mobile device at a framed photo at home.

2. User 1 uploads each image frame currently obtained to the cloud storage, feature extraction is performed at the cloud, the feature matching module may obtain match between extracted feature points and all of feature points in a directory corresponding to the user.

3. When feature matching is found, a moving image related with the still image in the frame is downloaded to the mobile device of User 1.

4. The mobile device of User 1 may track the still image in the current photo frame, and render the related moving image at the position of the still image, as shown in FIG. 7.

The above are detailed implementations of the method and the system of the present application. The present application can provides more content for still images, and can increase information and entertainment provided by still images. Further, the method may also provide a more robust tracking algorithm which can make extracted feature points be more evenly distributed.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method of presenting moving images or videos corresponding to a still image, comprising:
   storing a still image and a moving image or video corresponding to the still image into a cloud storage;
   extracting feature points from the still image stored in the cloud storage, and storing the feature points into the cloud storage in a manner which associates the feature points with the still image;
   extracting feature points from a first still image when a device obtains the first still image through scanning, comparing and judging whether the extracted feature points match feature points of each still image stored in the cloud storage to determine a second still image whose feature points match the feature points of the first still image; and
   rendering a moving image or video corresponding to the second still image stored in the cloud storage at a position of the first still image,
   wherein the moving image or video corresponding to the still image is generated by:
   receiving anchor points configured in the still image, dividing the still image into a moving part and a still part using the anchor points; determining a movement intensity of the moving part according to a length of an input arrow, and a movement direction of the moving part according to a direction of the input arrow; and generating the moving image or video corresponding to the still image by deforming image contents in the moving part according to the movement intensity and the movement direction while image contents in the still part are kept unchanged.

2. The method of claim 1, wherein extracting the feature points from the still image stored in the cloud storage is performed by the device or a cloud device.

3. The method of claim 1, wherein extracting the feature points from the still image comprises: dividing the still image into grids, and extracting feature points from image contents in each of the grids.

4. The method of claim 3, wherein thresholds for extracting feature points from different grids are identical or different.

5. The method of claim 1, wherein rendering the moving image or video corresponding to the second still image stored in the cloud storage at the position of the first still image comprises: calculating a transformation matrix between the first still image and the second still image, and performing the rendering according to the transformation matrix.

6. The method of claim 5, wherein calculating the transforming matrix between the first still image and the second still image comprises:

calculating an initial transformation matrix using an optical flow tracking algorithm, determining first feature points in the first still image according to the initial transformation matrix;

constructing, using the first still image, rectangular images which take the first feature points as center points and serve as matching templates, calculating an optimal matching position of each of the matching templates in the first still image to serve as second feature points, and calculating a transformation matrix between the second features points and feature points in the second still image to serve as the transformation matrix.

7. The method of claim 1, wherein comparing and judging whether the extracted feature points match feature points of each still image stored in the cloud storage comprises:

comparing the extracted feature points with features points of each still image stored in the cloud storage to obtain pairs of corresponding feature points, judging whether each pair of corresponding feature points is qualified, making a determination that the extracted feature points match the feature points of a still image when the proportion of qualified pairs reaches or exceeds a pre-defined threshold.

8. The method of claim 1, further comprising: setting different matching thresholds according to different needs, and making the determination as to whether the extracted feature points match the feature points of a still image based on a matching threshold selected according to current needs when comparing the extracted feature points with features points of each still image stored in the cloud storage.

9. The method of claim 1, wherein the still image and the moving image or video corresponding to the still image stored in the cloud storage comprise: a URL of the still image, and a URL of the moving image or video.

10. The method of claim 1, further comprising:

storing user information corresponding to the still image when the still image is stored into the cloud storage; and storing information of another user into the cloud storage in a manner which associates the information of the another user with a third still image when a user shares the third still image in the cloud storage with the another user.

11. The method of claim 1, wherein extracting features points from the first still image comprises: taking photos of the first still image at a pre-defined time rate, extracting feature points from each of the photos, comparing and judging whether feature points of each photo respectively match feature points of each still image stored in the cloud storage until a second still image whose feature points match the feature points of the photo is found.

12. A system of presenting moving images or videos corresponding to a still image, comprising:

a memory storing at least one instructions, and at least one processor configured to execute the one or more instructions to:

store a still image and a moving image or video and feature points corresponding to the still image into a cloud storage;

extract feature points of a still image stored in the cloud storage;

extract feature points from a first still image when a device obtains the first still image by scanning;

compare and judge whether the feature points extracted match the feature points of each still image corresponding to the same user in the cloud storage to determine a matching second still image; and render a moving image or video corresponding to the second still image stored in the cloud storage at a position of the first still image, wherein the moving image or video corresponding to the still image is generated by:

receiving anchor points configured in the still image, dividing the still image into a moving part and a still part using the anchor points; determining a movement intensity of the moving part according to a length of an input arrow, and a movement direction of the moving part according to a direction of the input arrow; and generating the moving image or video corresponding to the still image by deforming image contents in the moving part according to the movement intensity and the movement direction while image contents in the still part are kept unchanged.

* * * * *